(12) United States Patent
Tajika et al.

(10) Patent No.: US 6,992,693 B2
(45) Date of Patent: Jan. 31, 2006

(54) DISPLAY APPARATUS

(75) Inventors: Hiroshi Tajika, Kanagawa (JP); Kenji Kawazoe, Kanagawa (JP); Yuji Konno, Kanagawa (JP); Norihiro Kawatoko, Kanagawa (JP); Takayuki Ogasahara, Rochester, NY (US); Tetsuya Edamura, Kanagawa (JP); Tetsuhiro Maeda, Kanagawa (JP); Atsuhiko Masuyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 698 days.

(21) Appl. No.: 10/230,112

(22) Filed: Aug. 29, 2002

(65) Prior Publication Data

US 2003/0058335 A1   Mar. 27, 2003

(30) Foreign Application Priority Data

Sep. 7, 2001   (JP) .............................. 2001-272556

(51) Int. Cl.
*H04N 7/18*   (2006.01)
*H04N 5/64*   (2006.01)

(52) U.S. Cl. ..................... 348/59; 348/794; 345/905
(58) Field of Classification Search .................. 348/59, 348/739, 744, 787, 794, 827, 830–831, 836, 348/843; 345/903, 905; 248/274.1, 681; 361/682
See application file for complete search history.

(56) References Cited

U.S. PATENT DOCUMENTS

| 5,075,991 A | 12/1991 | Wenkman et al. ......... 40/152.1 |
| 5,588,526 A | 12/1996 | Fantone et al. .......... 206/308.1 |
| 5,629,833 A * | 5/1997 | Ido et al. ..................... 361/681 |
| 5,708,561 A * | 1/1998 | Huilgol et al. .............. 361/681 |
| 5,893,453 A | 4/1999 | Ishikawa ..................... 206/232 |
| 6,012,693 A * | 1/2000 | Voeller et al. ......... 248/280.11 |
| 6,081,420 A * | 6/2000 | Kim et al. ................... 361/681 |
| 6,226,906 B1 * | 5/2001 | Bar-Yona ..................... 40/454 |
| 6,522,529 B1 * | 2/2003 | Huilgol et al. .............. 361/681 |

FOREIGN PATENT DOCUMENTS

| CN | 1093187 | 10/1994 |
| CN | 1147234 | 4/1997 |
| EP | 0 583 766 | 2/1994 |
| JP | 6-209400 | 7/1994 |
| JP | 6-340099 | 12/1994 |
| JP | 8-320659 | 12/1996 |

(Continued)

OTHER PUBLICATIONS

S.H. Kaplam, "Theory of Parallax Barriers", Journal of the SMPTE, vol. 59, pp. 11-21 (Jul. 1952).

*Primary Examiner*—Vu Le
(74) *Attorney, Agent, or Firm*—Fitzpatrick, Cella, Harper & Scinto

(57) ABSTRACT

In a display apparatus (10), a lenticular lens (2) is detachable from or integrated with a frame (1). An insertion slot 3 for inserting an object to be displayed in the horizontal direction is formed between the frame (1) and lenticular lens (2). An arm (4) which is used to place the display apparatus to stand upright in a portrait or landscape position, and attachment grooves (5) that receive the arm (4) are formed on the back surface of the frame (1). The arm (4) and upper, lower, right, and left symmetrical attachment grooves (5) are formed to be able to place the display apparatus (10) in any of the upper, lower, right, and left directions when the object to be placed is set in a direction perpendicular to its insertion direction.

15 Claims, 17 Drawing Sheets

FOREIGN PATENT DOCUMENTS

| | | |
|---|---|---|
| JP | 8-320660 | 12/1996 |
| JP | 9-15766 | 1/1997 |
| JP | 9-30581 | 2/1997 |
| JP | 9-102968 | 4/1997 |
| JP | 9-309583 | 12/1997 |
| JP | 10-293266 | 11/1998 |
| JP | 11-259614 | 9/1999 |
| WO | WO 96/26872 | 9/1996 |

* cited by examiner

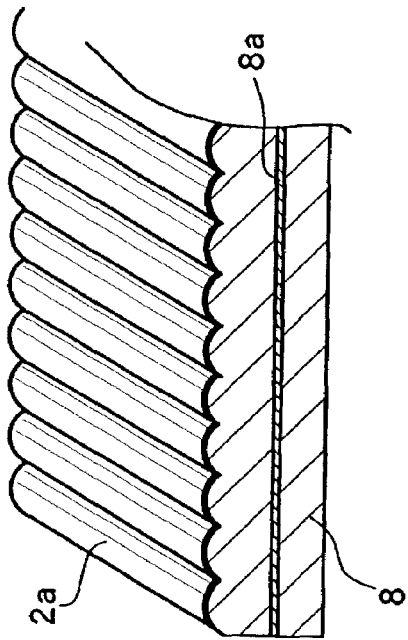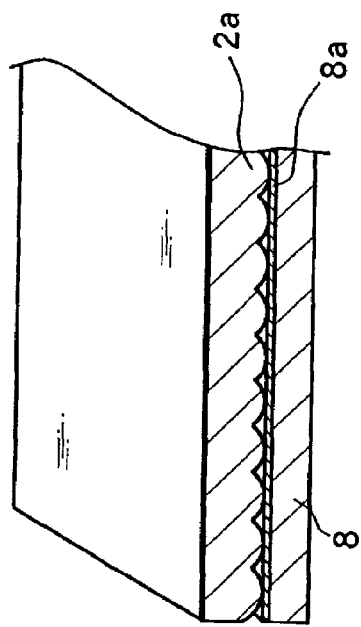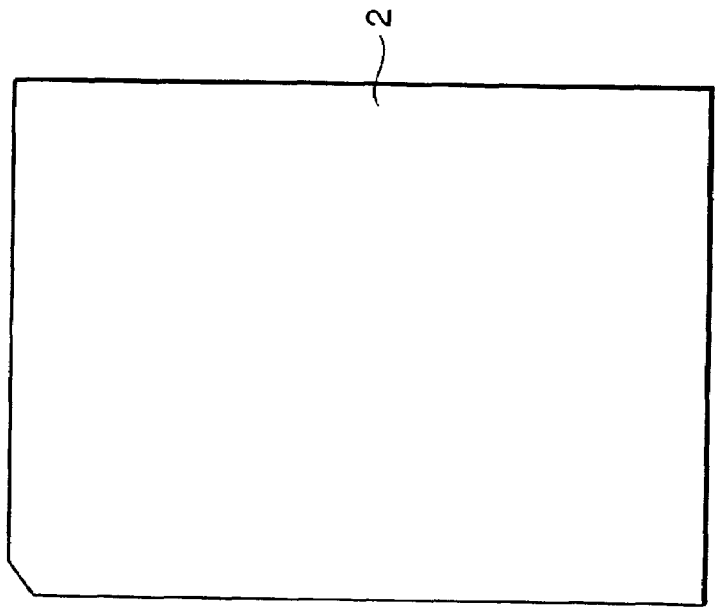

DISPLAY APPARATUS

FIELD OF THE INVENTION

The present invention relates to a display apparatus for stereoscopic images and moving images and, more particularly, to a display apparatus which can display an object to be displayed, on which stereoscopic or moving images are printed/recorded, via a lenticular lens without using any spectacles of, e.g., a lenticular method, parallax barrier method, or the like.

BACKGROUND OF THE INVENTION

As a method of forming/displaying a stereoscopic image without using any spectacles, a lenticular method that displays a stereoscopic image using a lenticular lens sheet, and a parallax barrier method that displays a stereoscopic image using a slit called a parallax barrier are widely known, and an object to be displayed on which a stereoscopic image is formed, its display apparatus, and the like using these methods are known.

The lenticular method had been extensively studied since 1970, and its effects are described in, e.g., Oplus E, November 1993, pp. 100–104.

The parallax barrier method is disclosed in, e.g., S. H. Kaplan "Theory of Parallax Barriers", J. SMPTE Vol. 59, No. 7, pp. 11–21 (1952).

The presence of the right and left eyes of a human being is important for the display of a stereoscopic image, and it is a common practice to specify the generating line direction (lens forming state) of the lenticular lens so as to recognize parallax or disparity images in the vertical direction (since parallax images are hardly recognized stereoscopically in the horizontal direction).

Since a moving image can be obtained in the same manner, this process will be briefly explained below.

Conventionally, moving image display panels that apply a lenticular lens are used in toys or for promotion purposes. Such panel displays a plurality of images on a single surface, and the observer can see a first or second image depending on the direction in which he or she observes the panel. This display panel has a structure in which original images are formed by a special method on the reverse surface of a planar lens (lenticular lens), on the obverse surface of which a large number of cylindrical lenses (quadric lenses having a hog-backed (semi-cylindrical) section). Stripe images obtained by cutting the first and second images into stripes are alternately arranged at the pitch of the lenticular lens, i.e., within the width of each individual cylindrical lens, and the observer can observe as if the first image has moved (changed) to the second image, since either the first or second image enters the eyes depending on the angle that the observer observes the lenticular lens. These images may use characters which are not successive in terms of shape, or may use successive moving images like a golf swing. Also, the number of images is not limited to two, and three or more different images (a maximum of eight different images) may be mixed to express images in turn.

The presence of the right and left eyes of a human being interferes with the display of a moving image, and it is a common practice to specify the generating line direction (lens forming state) of the lenticular lens so as to recognize images in the horizontal direction (since images are mixed in the vertical direction, and a change in image becomes vague.

Furthermore, the stereoscopic image forming apparatus has various means to easily generate an image.

For example, as a simple image forming method, Japanese Patent Laid-Open No. 10-293266 has proposed an image generation apparatus. As for pitch alignment between the lenticular lens and images, Japanese Patent Laid-Open No. 6-340099 has proposed a method using an optical sensor, and Japanese Patent Laid-Open No. 9-15766 has proposed a method of controlling ink-jet ejection timings. Furthermore, Japanese Patent Laid-Open No. 6-209400 has proposed a method of directly printing images on the reverse surface of a sheet-like lenticular lens, and Japanese Patent Laid-Open No. 9-102968 has made a proposal pertaining to the relationship with a binary printer.

Also, many display apparatuses for decorating these stereoscopic images have been proposed.

As an example of such display apparatuses, Japanese Patent Laid-Open Nos. 8-320659 and 8-320660 have proposed an arrangement which aligns a plurality of patterns to a storage case having a lenticular lens to increase contact between them. Also, Japanese Patent Laid-Open No. 11-259614 has proposed a card case and card. Furthermore, many applications to CD cases, cassette cases, and the like have been proposed. For example, Japanese Patent Laid-Open Nos. 9-30581, 9-309583, and the like are known.

However, in the method of aligning a lenticular lens to a plurality of patterns, as described in Japanese Patent Laid-Open Nos. 8-320659 and 8-320660, only an arrangement for aligning to a plurality of positions with reference to one position as an adjustment margin is described. However, it is difficult to attain tilt correction or delicate alignment with reference to only one position. Also, as for contact, only an arrangement for increasing contact by linearly pressing a plurality of portions by pressing members using spring members such as elastic members or the like from the reverse surface is disclosed. But this arrangement is not suitable bringing the entire surface of a thin, flat object having no stiffness such as a paper sheet into tight contact with the case by uniformly applying a pressure to it. Furthermore, in the conventional display apparatus represented by Japanese Patent Laid-Open No. 11-259614, only an outline of an arrangement is described, and no descriptions about a method of displaying a recent high-resolution stereoscopic image (a plurality of layers of stereoscopic images) and moving image (two or three or more layers of moving images), and their alignment are available. When the lens and case are independently movable, if alignment is insufficient especially in case of moving images, crosstalk of images (the observer sees a portion of an image that he or she does not want to observe, and feels distracted) occurs. In order to display a high-resolution stereoscopic image and moving image with high image quality, the contact between the lenticular lens and printed images (objects to be displayed) is important. If an image locally lifts, the image becomes unsharp, the stereoscopic effect impairs, and so forth. As a result of our examination, it is very difficult to display an especially high-resolution stereoscopic image/moving image (images output by a printing apparatus having an output resolution of 400 dpi or higher and, preferably, 600 dpi or higher) with high image quality. On the other hand, there is no description about compatibility with recent photo printers represented by ink-jet printers. Furthermore, as for the print size, only a case of a card or at most a cassette case is described, while the aforementioned tendency is protected to grow as the size of an output object becomes larger (postcard size or larger). Moreover, a lenticular lens which is compatible to the high-resolution output has a very small lens pitch, and end users cannot discriminate the obverse and reverse surfaces of the lens. If the user uses the wrong surface, the effect of a stereoscopic image/moving image cannot be obtained, and a method of easily discriminating the obverse and reverse surfaces of the lens is demanded.

SUMMARY OF THE INVENTION

The present invention has been made in consideration of the above situation, and has as its object to provide a display apparatus which is compatible to both a stereoscopic image and moving image in terms of the positional relationship between the generating line direction of a lenticular lens and image upon displaying an object to be displayed, on which a stereoscopic image (parallax) or moving image (time difference) is formed, via the lenticular lens, can achieve both tight contact between the lens and object to be displayed, and easy alignment of the image, and allows the user to insert the image without mistaking the obverse/reverse surface of the lens.

In order to solve the above problems and to achieve the above object, a display apparatus of the present invention is directed to a display apparatus which has a lenticular lens on a display surface of a display unit that houses an object to be displayed, and has an arm on a back surface thereof to allow the display unit stand upright, wherein the arm is symmetrically formed to allow the display unit to stand upright on any of upper, lower, right, and left sides thereof, and an attachment pattern of the arm with respect to the back surface of the display unit can be changed.

Preferably, in the above arrangement, the object to be displayed is inserted to be in tight contact with a rear surface of the lenticular lens which is formed integrally with the display unit, and after the object to be displayed is inserted, a position of an image formed on the object to be displayed can be adjusted by two-dimensionally moving the object to be displayed by at least two adjusters formed on the back surface of the display unit.

Preferably, in the above arrangement, the object to be displayed is inserted to be in tight contact with a rear surface of the lenticular lens which is formed to be independent of and detachable from the display unit, and after the object to be displayed is inserted, a position of an image formed on the object to be displayed can be adjusted by independently and two-dimensionally moving the object to be displayed and the lenticular lens by at least two adjusters formed on the back surface of the display unit.

Preferably, in one of the above arrangements, a stereoscopic image obtained by forming a plurality of parallax images in a stripe pattern from a two-dimensional image or a moving image obtained by forming a plurality of time difference images in a stripe pattern is formed on the object to be displayed.

Preferably, in one of the above arrangements, a stereoscopic image obtained by forming a plurality of parallax images in a stripe pattern from a three-dimensional image is formed on the object to be displayed.

Preferably, the stereoscopic image or moving image is formed by an ink-jet print method.

Preferably, the stereoscopic image or moving image is printed at a resolution of not less than 400 dpi or 600 dpi.

Preferably, at least a portion of an outer edge portion of the lenticular lens has a shape different from other portions.

Preferably, at least portion of the outer edge portion of the lenticular lens is notched.

Preferably, the lenticular lens is designed to allow a user to observe the object to be displayed as a stereoscopic image when the lenticular lens is placed in a portrait position, and as a moving image when the lenticular lens is placed in a landscape position.

Preferably, the object to be displayed is brought into tight contact with the rear surface of the lenticular lens when the object to be displayed is clamped by a pressing plate formed with the adjusters.

Preferably, the lenticular lens is formed into a convex shape, and the object to be displayed and the pressing plate having the adjusters are formed into a convex shape in correspondence with the lenticular lens.

Preferably, the lenticular lens is formed into a concave shape, and the object to be displayed and the pressing plate having the adjusters are formed into a concave shape in correspondence with the lenticular lens.

Preferably, at least the lenticular lens is formed of a styrene-based material.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 15A to 15C are views for explaining the arrangement of a lenticular lens according to the second embodiment of the present invention;

DETAILED DESCRIPTION OF THE PREFERRED EMBODIMENTS

Preferred embodiments of the present invention will be described in detail hereinafter with reference to the accompanying drawings.

The arrangement of a printing apparatus used to print on a lenticular lens, and the printing operation will be explained first with reference to the drawings.

Figure 1:
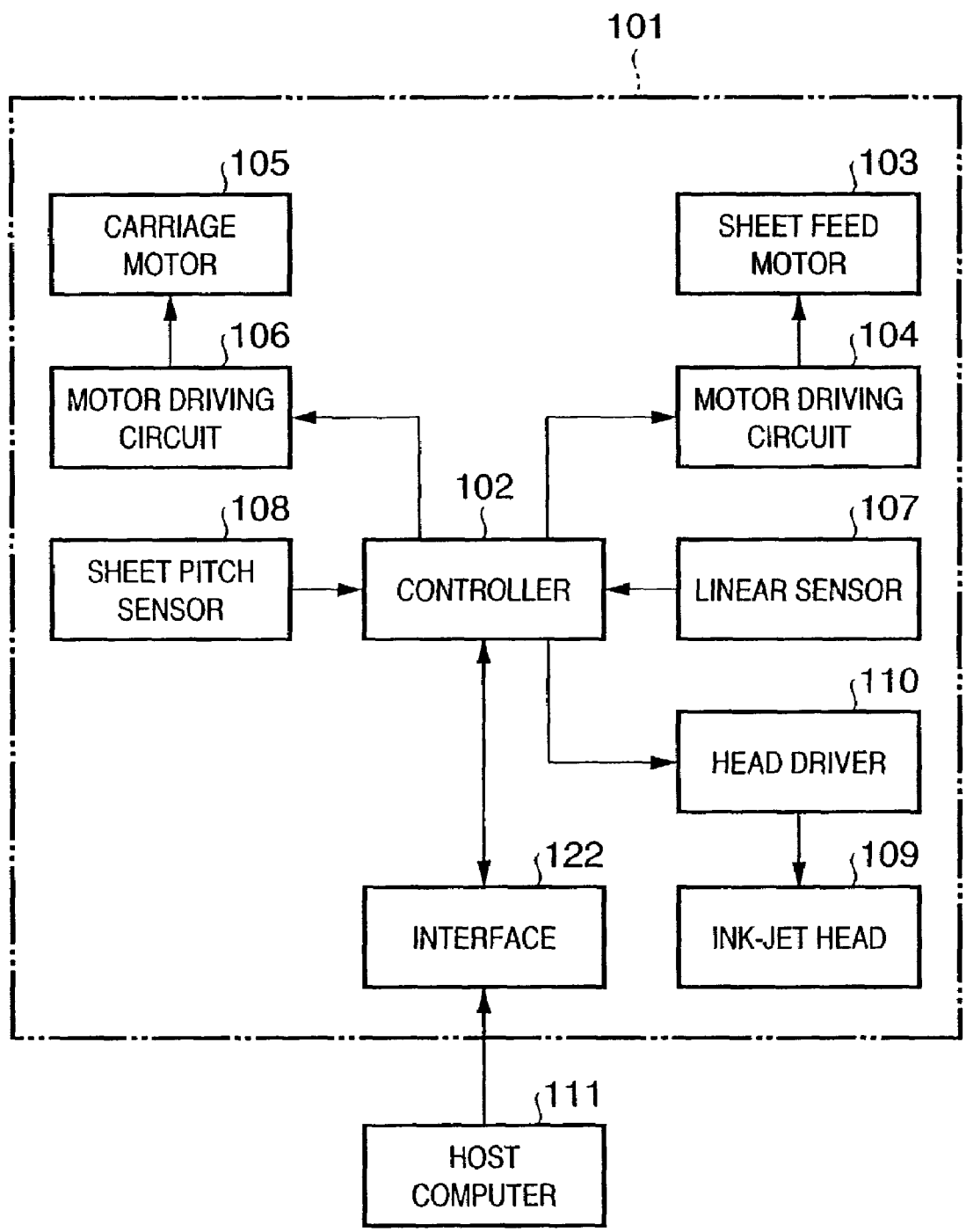
FIG. 1 is a block diagram showing the control arrangement of an ink-jet printing apparatus according to an embodiment of the present invention.
Figure 2:
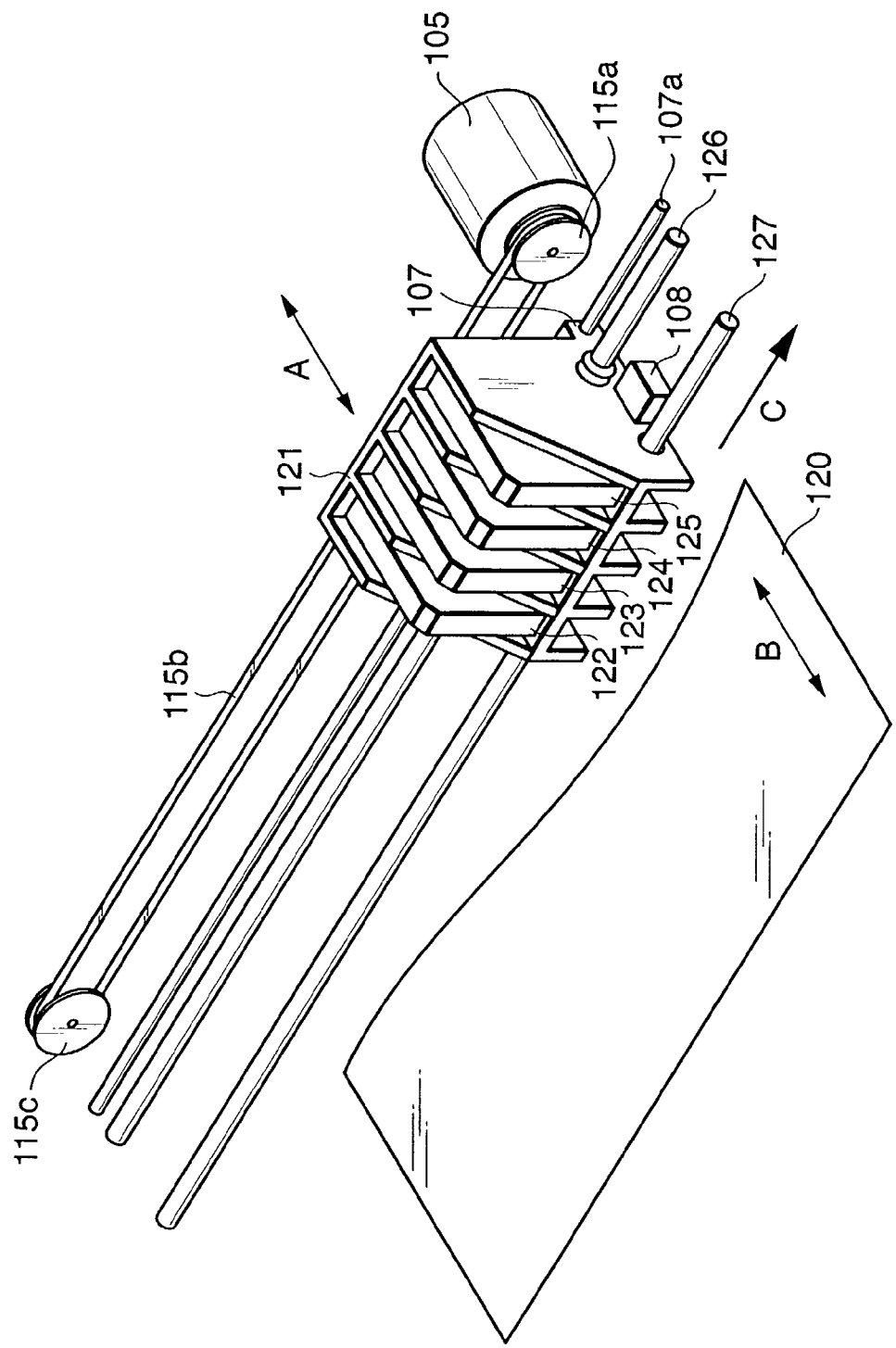
FIG. 2 is a perspective view showing the outer appearance of principal part of the ink-jet printing apparatus shown in FIG. 1.
Figure 3:
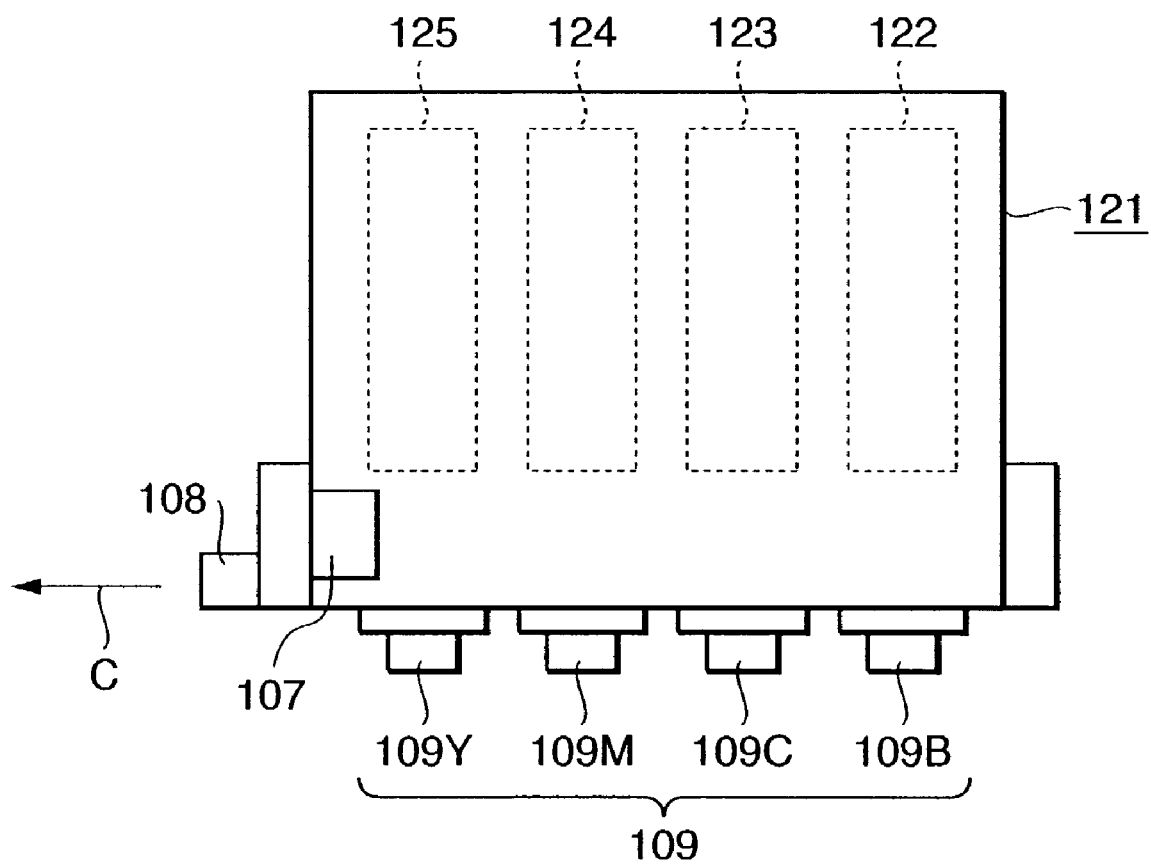
FIG. 3 is an elevational view showing the outer appearance of a carriage shown in FIG. 2 and an ink-jet head mounted on that carriage.

FIGS. 1 to 3 are schematic views for explaining the arrangement of an ink-jet printing apparatus according to an embodiment of the present invention, in which FIG. 1 is a block diagram showing the control arrangement, FIG. 2 is a perspective view showing the outer appearance of principal part of the ink-jet printing apparatus shown in FIG. 1, and FIG. 3 shows the outer appearance of a carriage viewed from the direction of an arrow A in FIG. 2.

Referring to FIG. 1, reference numeral 101 denotes a whole ink-jet printing apparatus. The ink-jet printing apparatus according to an embodiment of the present invention comprises a carriage 121 which mounts a printing means (ink-jet head 109) and an ink tank, a convey means (sheet feed motor 103 for generating a driving force upon conveying a lenticular sheet and a motor driving circuit 104 for controlling driving of the motor) for conveying a lenticular sheet 120 as a medium to be printed (lenticular print medium), and a control means (controller in the form of a CPU) 102 for controlling the entire apparatus including these means. The ink-jet head 109 that ejects ink from a plurality of ejection ports is serially scanned in a direction (main scan direction) perpendicular to the convey direction (sub-scan direction) of the lenticular sheet 120, while the lenticular sheet 120 is intermittently conveyed by an amount corresponding to a print width during a non-printing period.

In this embodiment, the position of the carriage, which is scanned by the driving force of the carriage motor 105, is detected by a linear sensor 107, as shown in FIG. 2. A sheet pitch sensor 108 detects the pitch of cylindrical lenses on the lenticular sheet 120 upon scanning the carriage. A print position (ejection position; to be described later) can be determined based on the detection output of the sheet pitch sensor 108.

The ink-jet head 109 is driven by a head driver 110 on the basis of image data input from a host computer 111 via an interface 112. That is, the ink-jet head 109 ejects ink onto the lenticular sheet upon scanning the carriage on the basis of the input image data, thus printing a predetermined digital image. The ink-jet head of this embodiment uses an electrothermal conversion element as an energy generation means. Hence, since a bubble can be formed in ink in an ink channel to have one-to-one correspondence with a driving electrical pulse signal, and can immediately and adequately grow/shrink, ink ejection with short response time can be attained. Also, it is easy to make the ink-jet head compact, and merits of the IC and micropatterning technologies, which have made notable progresses and gained high reliability in the recent semiconductor field can be fully utilized, thus achieving easy high-density packaging and low manufacturing cost.

Image data used in the ink-jet printing apparatus 101 of this embodiment is composited on the host computer 111 as a host apparatus, and is sent to the controller 102 via the interface 112. The data sent to the controller 102 is obtained by compositing images having parallax, as will be described later, and the controller 102 executes a predetermined image process of such images to generate ejection data and temporarily stores it in a predetermined memory (not shown).

As shown in FIG. 2, the aforementioned carriage 121 slidably engages with two guide shafts 126 and 127. A portion of the carriage 121 is connected to a belt 115b, which is stretched between pulleys 115a and 115c to be parallel to the guide shafts 126 and 127 and to fall within nearly the same range as the guide shafts 126 and 127. The driving force of the carriage motor 105 is transmitted to the carriage 121 via these components to move (main scan) the carriage along the guide shafts 126 and 127.

The ink-jet printing apparatus 101 of this embodiment is compatible to color printing, and forms a color image by overlaying ink dots ejected by a plurality of colors of ink-jet heads. Hence, the apparatus 101 mounts three or four types of ink-jet heads and ink-cartridges corresponding to three primary colors, i.e., yellow (Y), magenta (M), and cyan (C) or four colors including black (B) in addition to these three primary colors. That is, in this embodiment, ink-jet cartridges 122 to 125, each of which integrates an ink-jet head and ink tank, are mounted on the carriage 121. These cartridges are provided in correspondence with black, cyan, magenta, and yellow inks, and are detachably attached to the carriage 121.

The linear sensor 107 provided to a portion of the carriage 121 slidably engages with a linear scale 107a, which extends in a direction parallel to the guide shafts 126 and 127. With these components, the scan position of the carriage 121 can be detected. Note that a known arrangement can be used for detection and, for example, a magnetic or optical detection means may be used. On the other hand, the sheet pitch sensor 108 is provided to face the scan region of the ink-jet heads of the carriage 121. With this sensor, the pitch of respective cylindrical lenses of the lenticular sheet can be detected, as will be described later.

Referring to FIG. 3, reference numerals 109B, 109C, 109M, and 109Y denote ink-jet heads, which respectively receive black, cyan, magenta, and yellow inks from ink tanks integrated to them, and eject ink onto the lenticular sheet 120 (see FIG. 2), thus forming ink dots on that sheet.

In the ink-jet printing apparatus 101 of this embodiment described above, the carriage 121 scans in the longitudinal direction of respective lenticular lenses (cylindrical lenses) of the lenticular sheet 120, i.e., in a direction perpendicular to the generating line direction (the direction of an arrow B in FIG. 2) of the lenticular lenses, thus printing an image using the ink-jet heads 109Y, 109M, 109C, and 109B. With this mechanism, the sensor 108 as a means for detecting the pitch of the lenticular lenses can be effectively used for the method of printing an image by scanning the carriage in the generating line direction of the lenticular lenses, and the precision of the print position can be easily improved, as will be described later.

Figure 4:
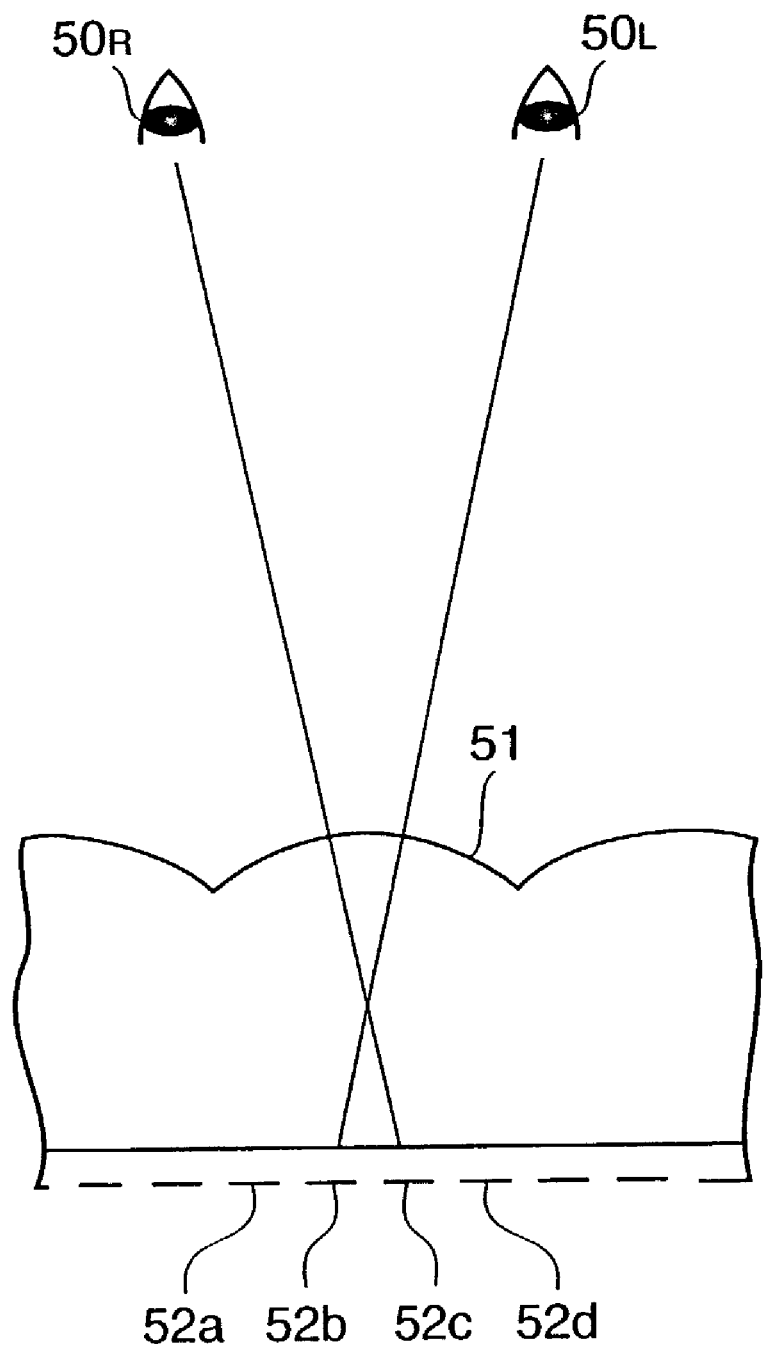
FIG. 4 is a view for explaining stereovision when a lenticular sheet applied to an embodiment of the present invention is used.

FIG. 4 is an explanatory view for explaining stereovision of an image on the lenticular sheet, which is printed, as described above.

When a person recognizes an object or image as a stereoscopic image with a depth, parallax or disparity must be given to the right and left eyes. Referring to FIG. 4, reference numeral 50R denotes a right eye of an observer; 50L, a left eye of the observer; 51, a lenticular sheet; and 52a, 52b, 52c, and 52d, images (dots) recorded on the lenticular sheet 51. In a lenticular scheme, images which enter the right and left eyes 50R and 50L are respectively images 52c and 52b of those separated by the lenticular sheet 51, as shown in FIG. 4, and when a predetermined parallax is given to these two images, stereovision can be achieved. Stereovision can be realized if there are a total of two images, i.e., one each image for the right and left eyes. However, if two images are used, the stereovision region is narrow, and reverse stereovision regions having nearly the same sizes are generated side by side. To solve such drawback, multi-image conversion (four images in this embodiment) of two or more images is made. In this case, as the number of images is larger, the stereovision region becomes broader and the reverse stereovision region becomes narrower, as is generally known.

An original image composition & print sequence of this embodiment will be explained below.

<①  Image Process by Host Computer>

An image process including a stripe process, composition process, and the like is executed to achieve lenticular stereovision.

<②  Supply of Data from Host Computer to Ink-Jet Printing Apparatus>

A composite image generated by the host computer 111 is sent as compressed or non-compressed data. The ink-jet printing apparatus executes a predetermined image process for the received image using an area gradation method as gradation expression. In this case, a gradation matrix of area gradation is specified by rectangles, the longitudinal direction of which agrees with the generating line direction of lenticular lenses, thus achieving lenticular multi-image conversion. Also, multi-image conversion can be achieved by forming a stripe-like gradation matrix using every n lenticular lenses.

<③  Supply of Lenticular Sheet>

The lenticular sheet 120 is supplied to the ink-jet printing apparatus of this embodiment by manual insertion or an auto-sheet feeder.

<④  Print>

As shown in FIG. 2, the ink-jet printing apparatus of this embodiment has a form of so-called serial printer. That is, in FIG. 2, the supplied lenticular sheet 120 is conveyed by a sheet convey means (not shown) to a position facing the ink-jet head 109, which ejects ink for each scan of the carriage 121 to print one line (one scan), and the sheet is conveyed by a 1-line width.

During this period, the sheet pitch sensor 108 detects the pitch (sheet pitch) of the lenticular lenses of the lenticular sheet 120, and the linear sensor 107 detects the carriage position, i.e., the position of the ink-jet head 109. Based on this sheet pitch and the position information of the ink-jet head, the controller 102 controls the ink ejection timing of the ink-jet head 109. As can be seen from the above description, the sheet pitch sensor is provided at a leading position in the direction of the ink-jet head scan.

By repeating the above operation for each scan of the carriage, the lenticular sheet 120 undergoes a print process.

<⑤  Exhaust Lenticular Sheet>

The lenticular sheet 120 is exhausted outside the apparatus using a convey means (not shown).

In this embodiment, the lenticular sheet 120 undergoes a print process using the serial-type ink-jet printing apparatus. Alternatively, a so-called full-line type ink-jet printing apparatus, i.e., an ink-jet printing apparatus which uses an ink-jet head having ink ejection ports over the range corresponding to the width of a sheet to be conveyed, can achieve the aforementioned print process. In this case, the lenticular sheet 120 is conveyed in a direction perpendicular to the generating line direction of the lenses, and the sheet pitch is detected upon conveying the sheet.

In this embodiment, a sheet-like medium is used as a lenticular print medium, but continuous forms may be used.

Figure 5:
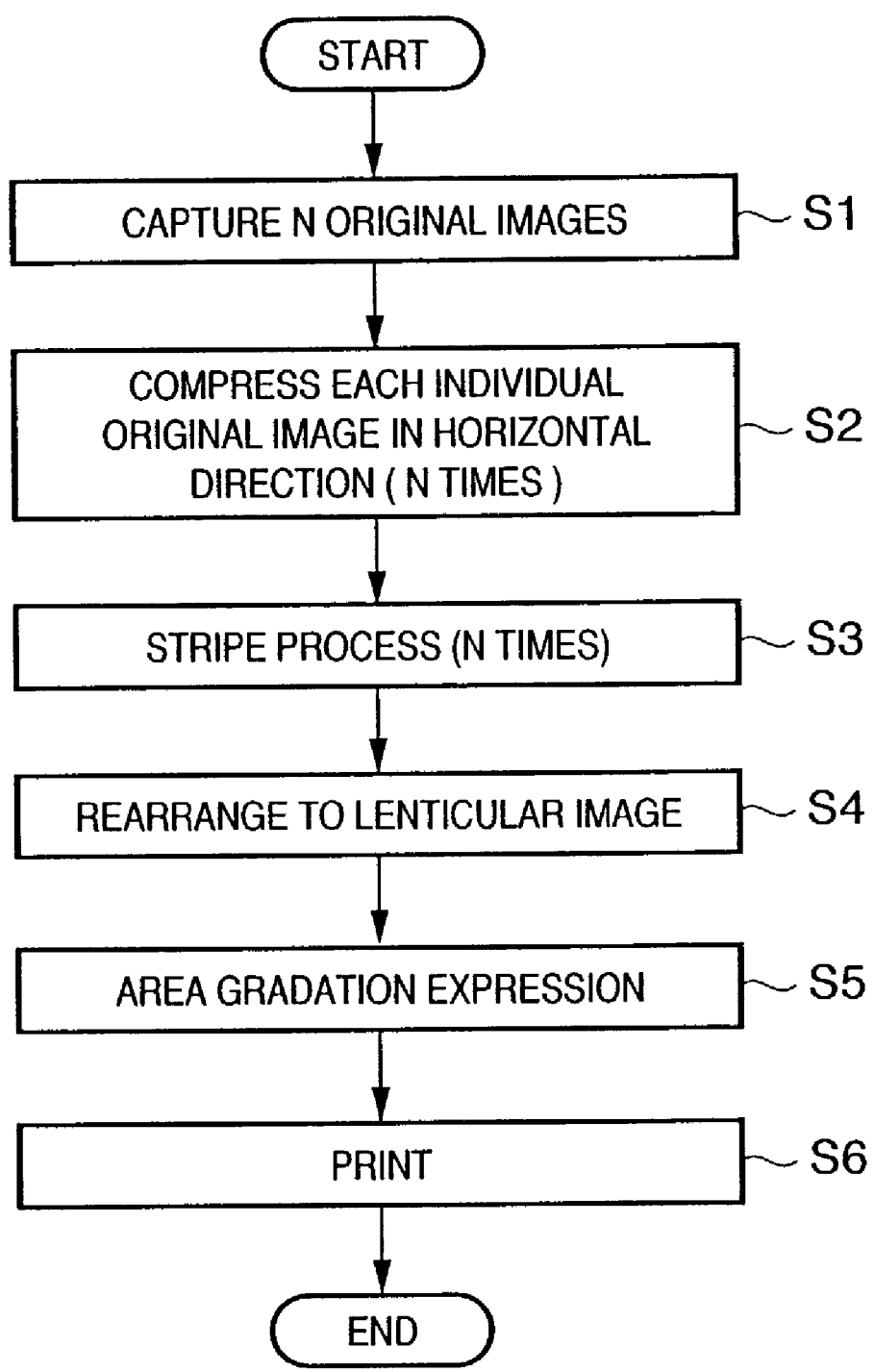
FIG. 5 is a flow chart for explaining the image processing steps upon forming a lenticular stereoscopic image by the ink-jet printing apparatus according to an embodiment of the present invention.

FIG. 5 is a flow chart showing the image processing steps upon forming a lenticular stereoscopic image to be generated in this embodiment.

[Step S1: Capture N Original Images (N>2)]

The image format of images to be processed as parallax images on the host computer 111 is not particularly limited as long as they can be processed by the host computer 111, and TIFF, PICT, JPEG, and the like may be used. However, it is effective for the post-process to simultaneously write in the header field of the image header information of a parallax image as the n-th ($n \leq N$) lenticular image from the right (or left) of N original images, and photographing conditions such as the base length, the focal length of a photographing camera, and the like. As a means for forming parallax images, a stereo camera that photographs images with a predetermined base length, a multinocular camera having a plurality of optical systems, a slide camera that moves a camera using a mechanical translating means, and the like may be used, and their image sensing methods are not particularly limited and may include a silver halide system, photoelectric conversion using a CCD or the like, and the like as long as taken images can be processed on the host computer via a scanner or predetermined interface. Also, as a means for obtaining parallax images, it is effective to form N predetermined parallax images by, e.g., computer graphics in addition to the aforementioned means for photographing images of an actual object.

[Step S2: Compress Each Individual Original Image in Horizontal Direction]

The original images obtained in step S1 are compressed to 1/N in a direction (horizontal direction) perpendicular to the generating line of lenticular lenses of a final lenticular image. This is to print N images per lenticular lens. If an ink-jet printer having an N× resolution in the horizontal direction of the lenticular lenses is used, the images need not be compressed. On the other hand, if the ratio of vertical and horizontal printer resolutions is given by NP=(horizontal resolution)/(vertical resolution), each individual original image used in lenticular stereovision can be compressed at a ratio NP/N in the horizontal direction. Since images are compressed in an early stage of processes on the host computer, the memory can be saved, and the processing time can be shortened. At this time, since N parallax images have very high correlation, they can be compressed using difference signals or adding motion vectors, and the signal volume to be processed can be reduced.

[Steps S3 and S4: Stripe Process and Rearranging to Lenticular Image]

Each individual parallax image in principle, which forms a lenticular stereoscopic image, is divided into stripe patterns, and the obtained stripe patterns are rearranged to obtain a lenticular stereoscopic image, as described above with reference to FIG. 4. At this time, since images are reversed by the lenticular lenses, the order in which the images are arranged is reversed accordingly. In order to save the memory of the host computer 111, the aforementioned compressed images may be used, and may be rearranged while being expanded.

[Step S5: Area Gradation Expression]

The ink-jet print scheme expresses an image by ejecting or not ejecting ink. Hence, since an image is a digital image as a two-dimensional set of a large number of pixels as building units, and only one dot corresponding to one pixel cannot express gradation, gradation expression is achieved by a matrix pattern having a given area.

Figure 6:
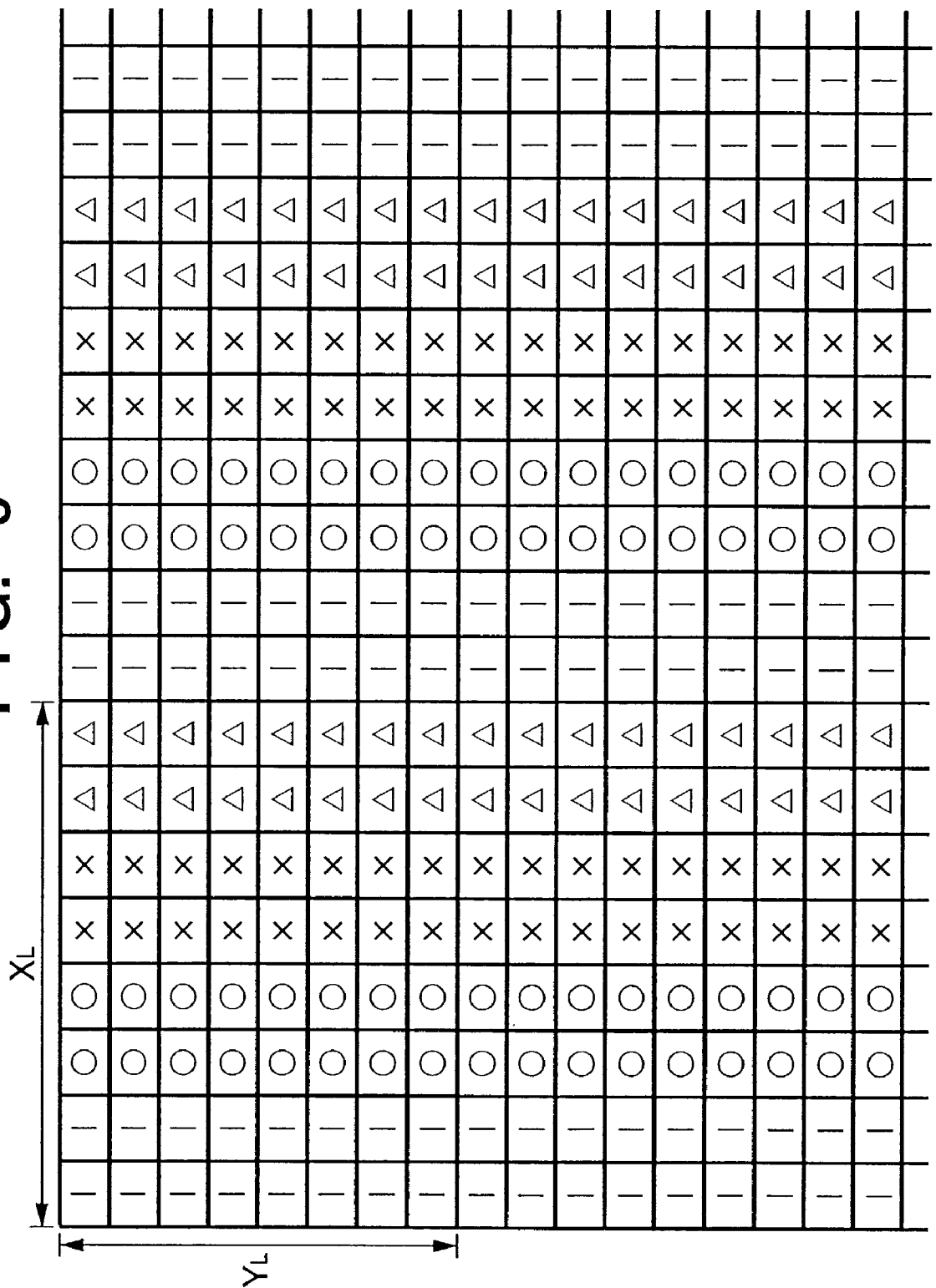
FIG. 6 is a view for explaining an area gradation method applied to an embodiment of the present invention.

FIG. 6 is a view for explaining an area gradation method applied to an embodiment of the present invention. The matrix pattern of an image corresponding to one pitch of the lenticular lens is defined by 8 pixels in the X direction (the radial direction of the lenticular lens), and 8 pixels in the Y direction (the generating line direction of the lenticular lens). That is, reference symbol XL in FIG. 6 denotes the width for one pitch of the lenticular lens; and YL, the size of one matrix pattern in the generating line direction of the lenticular lens. Since four images are used in this embodiment, they are printed every 2×8 dots within the width XL.

Figure 7:
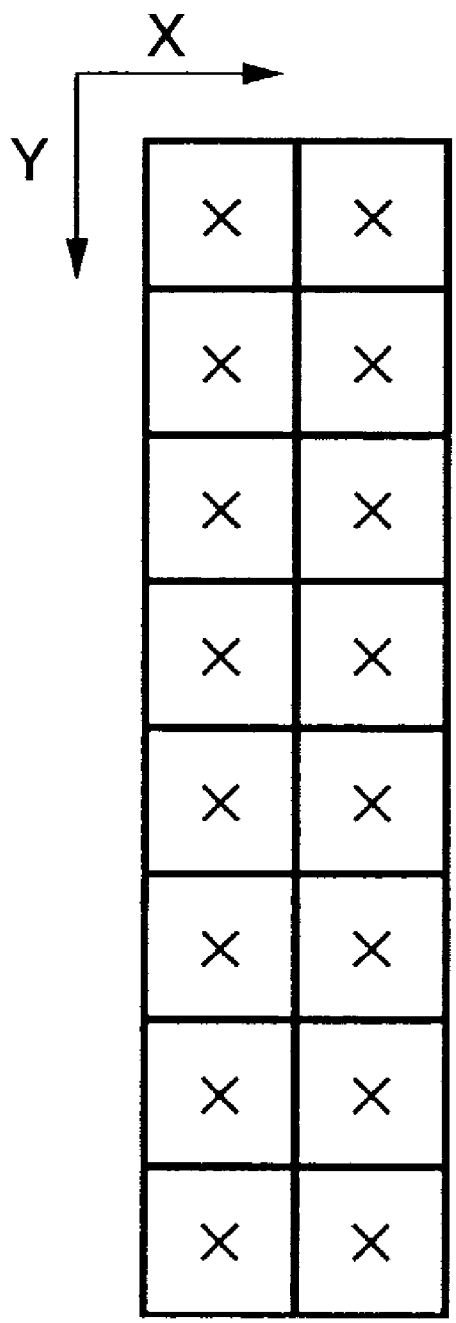
FIG. 7 is a view for explaining an area gradation method applied to an embodiment of the present invention.

FIG. 7 shows the matrix pattern of one image in that of the images shown in FIG. 6. This matrix pattern is defined by 8 dots in the generating line direction, and 2 dots in the direction perpendicular to that direction. Hence, 16 gray levels can be expressed.

Upon practicing the area gradation expression method, any error between the tone value of an original image and that of an image to be printed must be corrected. For this purpose, an error diffusion method is used in this embodiment.

Figure 8:
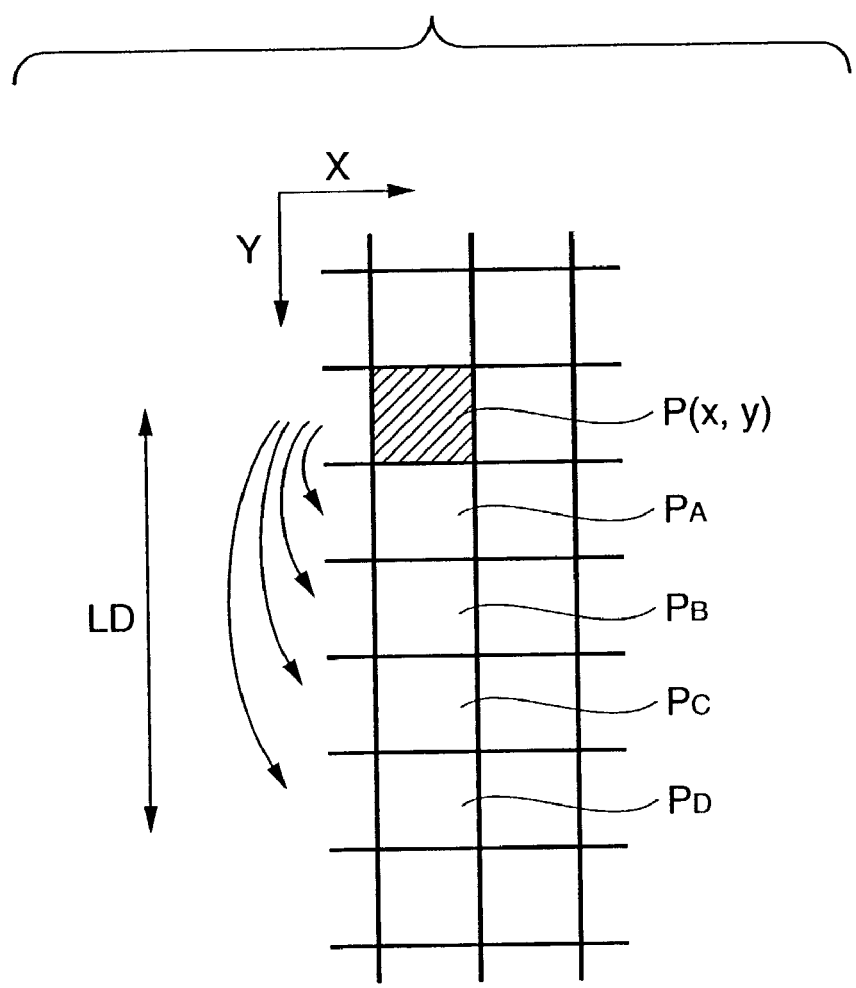
FIG. 8 is a view for explaining an error diffusion method applied to an embodiment of the present invention.

FIG. 8 shows error diffusion in this embodiment using error diffusion, and LD in FIG. 8 indicates the generating line direction of the lenticular lens. An error Exy of a given pixel P(x, y) in the original image is diffused in only the Y direction (the generating line direction of the lenticular lens). In this embodiment, that error is diffused to pixels PA, PB, PC, and PD, which line up in the Y direction. Also, weighting is made (i.e., the diffusion ratio of an error is determined) depending on the distance, and the weighting coefficient becomes smaller with increasing distance.

[Step S6: Print]

In this way, the image or signal process is executed to control ejection of the ink-jet head, thus printing an image. The binary print process that prints depending on the presence/absence of ink has been explained. Also, the same applies to a multi-valued print process that can control the ink amount.

[First Embodiment]

A stereoscopic image (moving image) display apparatus according to the first embodiment of the present invention will be described below.

As shown in FIGS. 9A and 9B to FIG. 12, a display apparatus 10 of this embodiment has a lenticular lens 2 which is independently detachable from or is integrated with a frame 1. An insertion slot 3 used to insert an object to be displayed from the horizontal direction is formed between the frame 1 and lenticular lens 2. On the back surface of the frame 1, an arm 4 used to place the display apparatus to stand upright in a portrait or landscape position, and attachment grooves 5 which receive the arm 4 are formed.

The attachment grooves 5 are formed on the back surface of the frame 1 in a cross pattern. One end portion 4a of the arm 4 is fitted into one of the upper, lower, right, and left attachment grooves 5, and the other end 4b is separated away from the back surface of the frame 1, thus placing the display apparatus to stand upright in a portrait or landscape position.

The display apparatus 10 can be freely placed in a portrait or landscape position. The arm 4 and the upper, lower, right, and left symmetric attachment grooves 5 are designed to be able to place the display apparatus 10 in any of the upper, right, right, and left directions when an object to be displayed such as a paper sheet on which the image is printed is set in a direction perpendicular to its insertion direction, and an arbitrary one of the attachment grooves 5 can be selected for the arm 4.

Figure 9A:
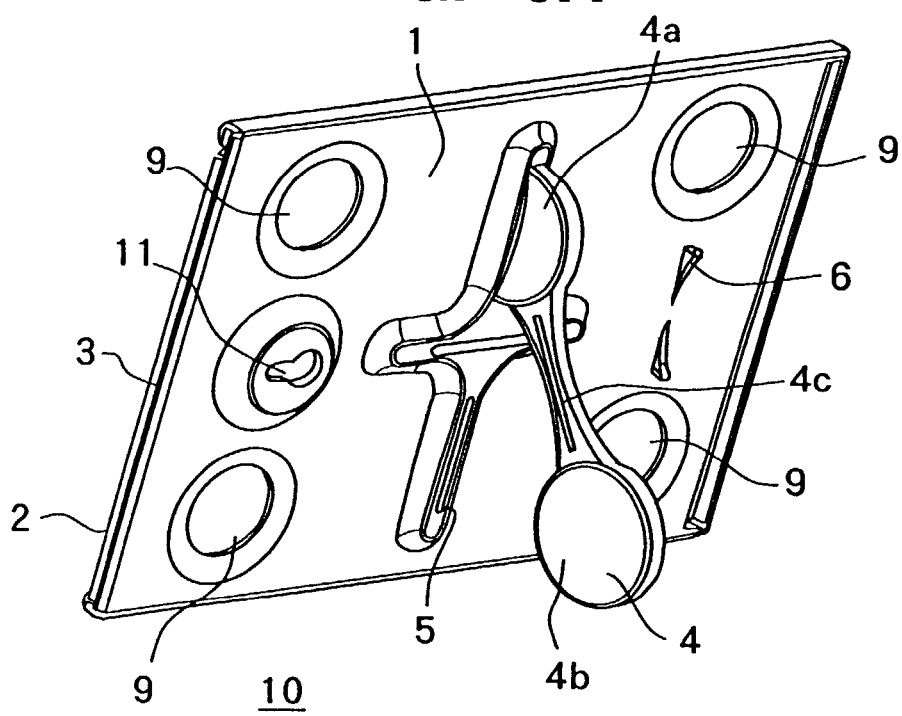
FIGS. 9A and 9B are perspective views showing the outer appearance of a display apparatus according to the first embodiment of the present invention.

In this embodiment, the object to be displayed is inserted from the insertion slot 3 extending in a direction perpendicular to the longitudinal direction (horizontal direction) of the frame 1. This insertion slot is formed to cope with both right- and left-handed users. As shown in FIG. 9A, the right-handed user holds the object to be displayed in his or her right hand, and the frame in his or her left hand so as to insert/remove it, and mounts the arm 4 on the back surface of the frame with his or her right hand.

Figure 9B:
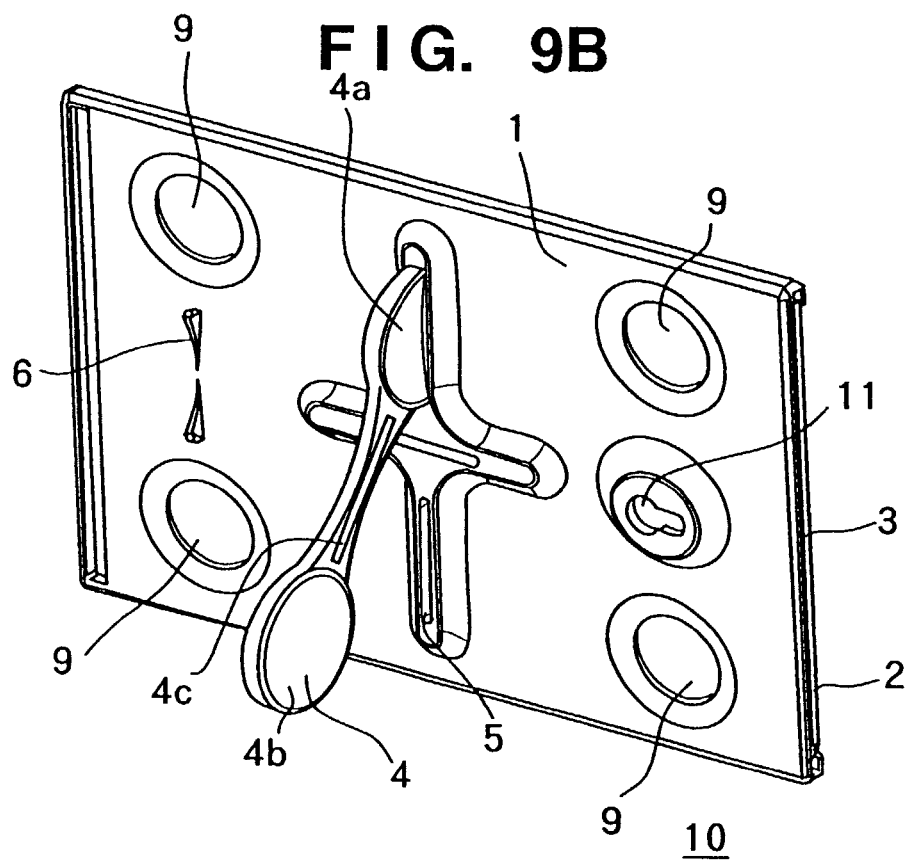
Figure 10A:
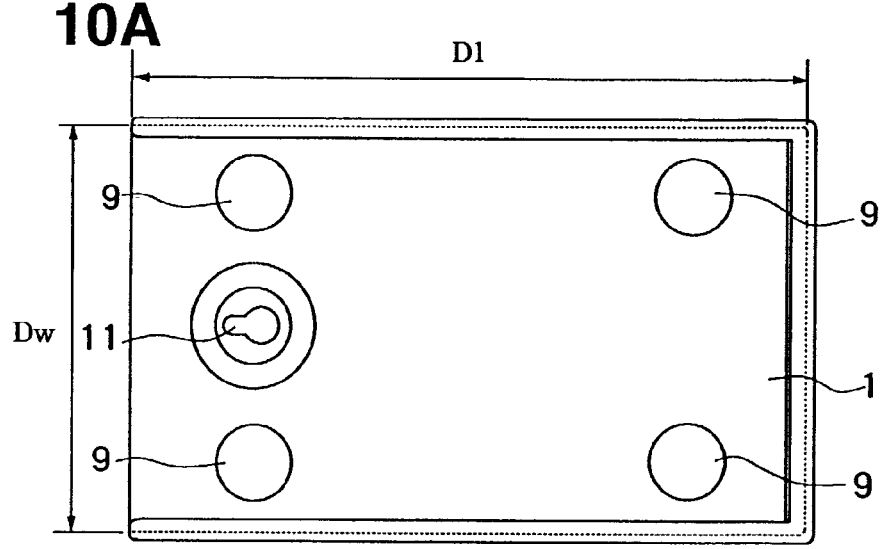
FIGS. 10A to 10C are front views of the display apparatus, a lenticular lens, and an object to be displayed according to the first embodiment of the present invention.
Figure 10B:
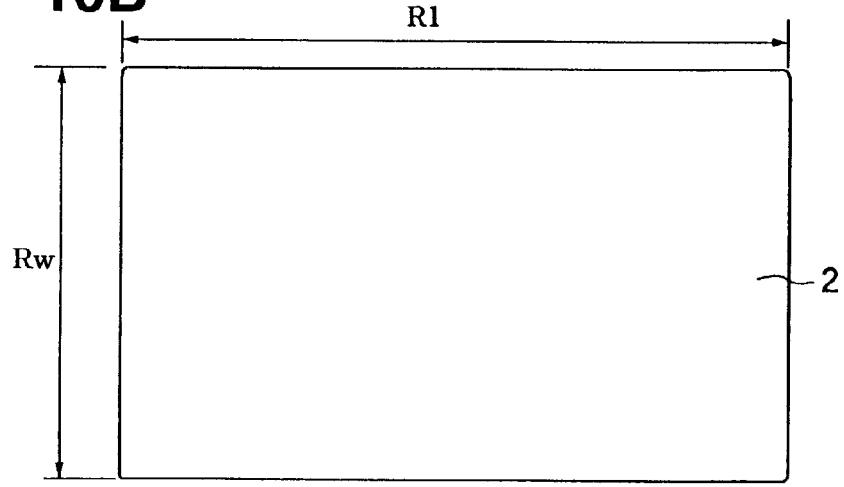
Figure 10C:
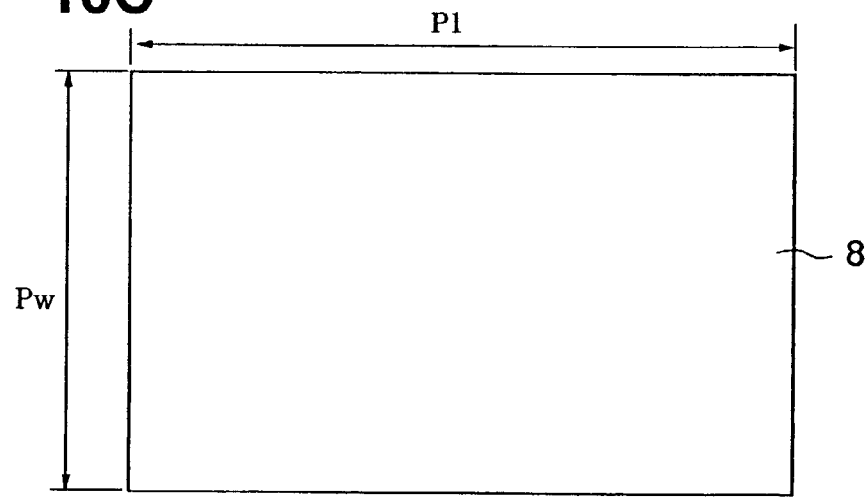
Figure 11:
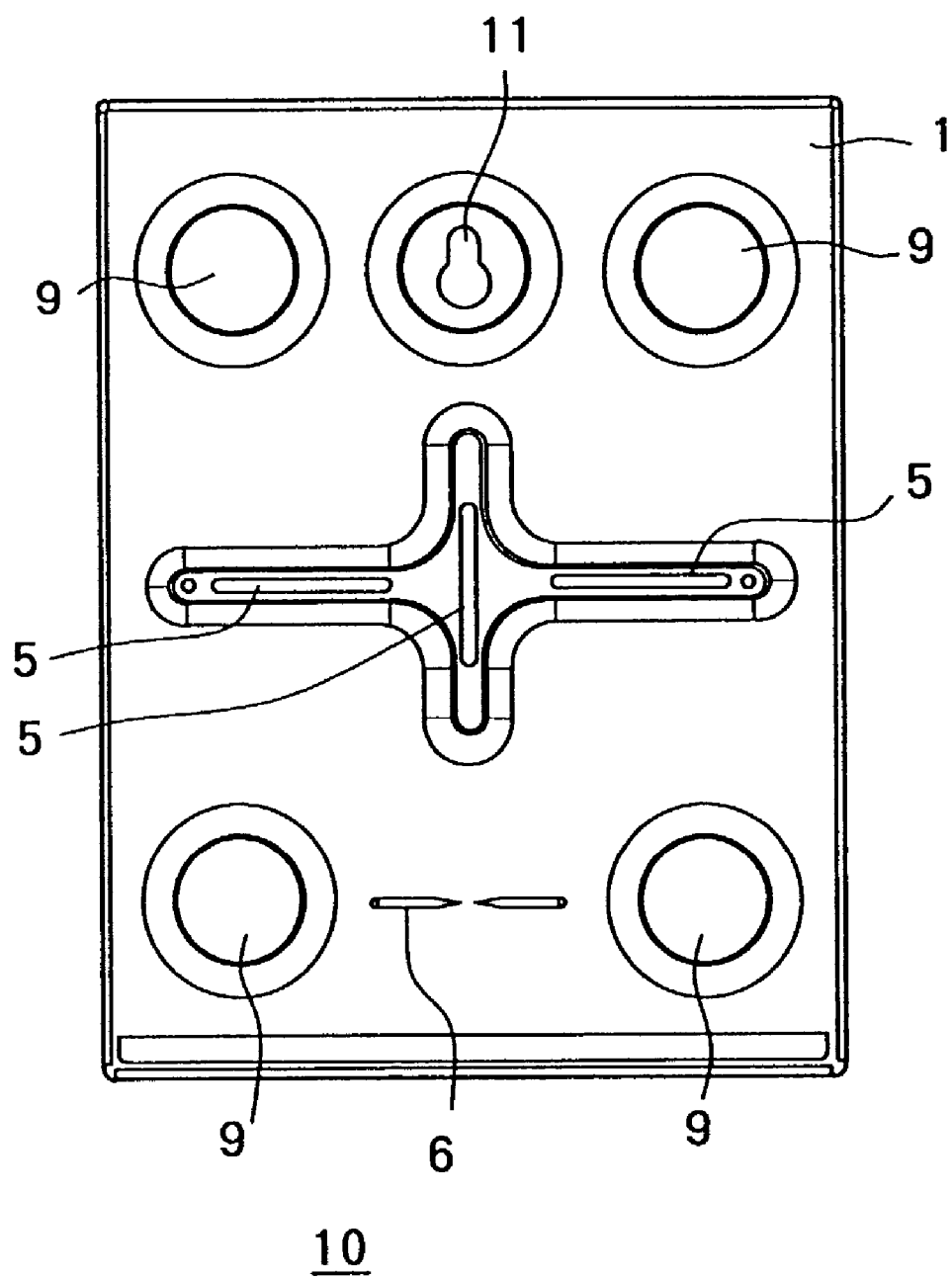
FIG. 11 is a rear view of FIGS. 9A and 9B.

As shown in FIG. 9B, when the left-handed user inserts the object to be displayed in the way opposite to that described above, he or she can attach the arm 4 to the upper or lower symmetric attachment groove 5 on the back surface of the frame. In either case, the user can easily place the display apparatus without passing the frame 1 from one hand to the other.

Figure 12:
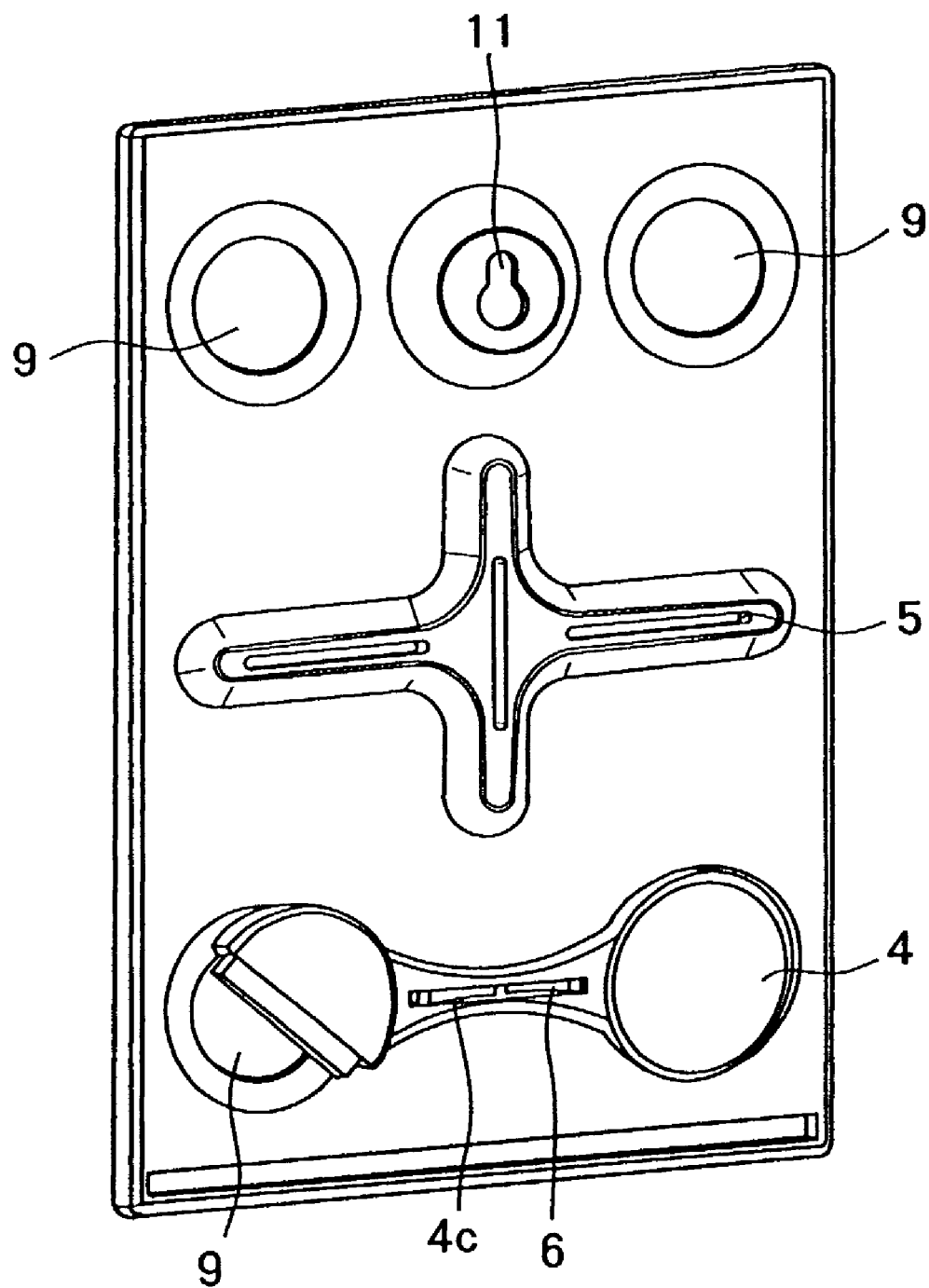
FIG. 12 is a rear view showing a state wherein a frame leg portion of the display apparatus according to the first embodiment of the present invention is stored.

FIG. 12 shows a state wherein the arm is stored on the back surface of the frame. When the display apparatus 10 is not used, or when the display apparatus 10 is used while being hung on the wall without using the arm 4, a groove 4c formed at the central portion of the arm 4 is fitted on an attachment portion 6 which projects from the back surface of the frame 1 to store the arm 4 on the back surface of the frame 1. In this case, a wall-hanging portion 11 can be used. Then, the arm 4 can be prevented from being lost while it is not used.

Furthermore, the display apparatus 10 of this embodiment has a pressing plate (not shown) which presses the object to be displayed in tight contact with the back surface of the lenticular lens 2.

The lenticular lens 2 must select a material which can assure transparency of the lens, high shape precision of the convex surface and high lens pitch precision, has a small temperature change coefficient, and has high environmental suitability, and a harmless material such as a styrene-based material, acrylic resin, or the like is used (a styrene-based material is preferably used in terms of cost). Also, the frame is formed using a material similar to the lens material (although the same material need not be used, a material which also has a small temperature change coefficient to assure a small change in size is preferably selected).

The object to be displayed (and the pressing plate as needed) is inserted from the insertion slot 3 of the frame 1, so that the image surface of the object to be displayed contacts the back surface of the lenticular lens 2 having a convex surface, and is pushed into the end of the slot. After insertion of the object to be displayed, the object to be displayed is aligned by fingers via at least two adjustment holes 9 (two holes in the storage state of the arm 4; a maximum of four holes) while observing an image from the convex surface side of the lenticular lens 2, so that the stripe images of the object to be displayed become parallel to the generating line direction of the lenses (stereoscopic image; vertical direction/moving image; horizontal direction). Then, alignment is stopped at a position where the highest stereoscopic effect is obtained (movable image; at a position where crosstalk is minimized (more than one images are not observed), thus obtaining the best stereoscopic image (moving image).

In the alignment state, since at least two adjustment holes 9 are formed, the object to be displayed can be immediately moved two-dimensionally compared to a conventional apparatus in which the object to be displayed is adjusted via only one hole, thus allowing flexible confirmation of the stereoscopic state and position adjustment. Also, in order to facilitate alignment, upon fixing the lenticular lens 2 to the frame together with the object to be displayed on which the stereoscopic image (moving image) is printed, since the relationship (among the inner size (width Dw and length Dl) of the frame of the display apparatus, the outer size (width Pw and length Pl) of the object to be displayed, and the outer size (width Rw and length Rl) of the lenticular lens 2 (see FIGS. 10A to 10C) is determined in advance to satisfy:

$$D(w, l) > P(w, l) \geq R(w, l)$$

for $D(w, l) = D(w, l) - \alpha(w, l) = P(w, l) = D(w, l) - \alpha(w, l) - \beta(w, l) = R(w, l)$ $\alpha(w, l) = 1.0$ to $2.0$ mm, $\beta(w, l) = 0$ to $2.0$ mm alignment between the lenticular lens 2 and image can be attained by moving the object to be displayed or by relatively moving both the object to be displayed, thus obtaining high alignment precision (about several ten $\mu$m) required for a high-resolution stereoscopic image or moving image.

Note that the lenticular lens 2 and frame can be formed using molds or by injection molding.

The principle of allowing the user to observe a stereoscopic image/moving image via such lenses is the same as that in the prior art, and a description thereof will be omitted.

As described above, according to the first embodiment, upon displaying an object to be displayed on which a stereoscopic image (parallax) or moving image (time difference) is formed via a lenticular lens, the positional relationship between the generating line direction of the lenticular lens and image is compatible to both the stereoscopic image and moving image, both tight contact between the lens and object to be displayed, and easy alignment of the image can be achieved, and the image can be inserted without mistaking the obverse/reverse surface of the lens.

Also, the arm is formed symmetrically, and an arm attachment pattern to the back surface of the display unit can be changed, so that the display unit can stand upright on any of its upper, lower, right, and left sides. Hence, either a right- or left-handed user can easily place the display unit while inserting and the object to be displayed and aligning the image.

Furthermore, since the object to be displayed on which an image is formed can be exchanged as needed, a high-quality (400 dpi or higher) stereoscopic image or moving image, which requires high alignment precision and is available in only a state wherein it is adhered to the lens, can be exchanged as needed.

Also, a two-dimensional image input using a digital camera or the like can be converted into three-dimensional parallax images by a simple image processing apparatus or software, and a printout of an ink-jet printing apparatus or the like as an image output apparatus can be displayed as an image. Hence, everyone can easily acquire such image with low cost.

[Second Embodiment]

A display apparatus according to the second embodiment of the present invention will be described below.

Figure 13:
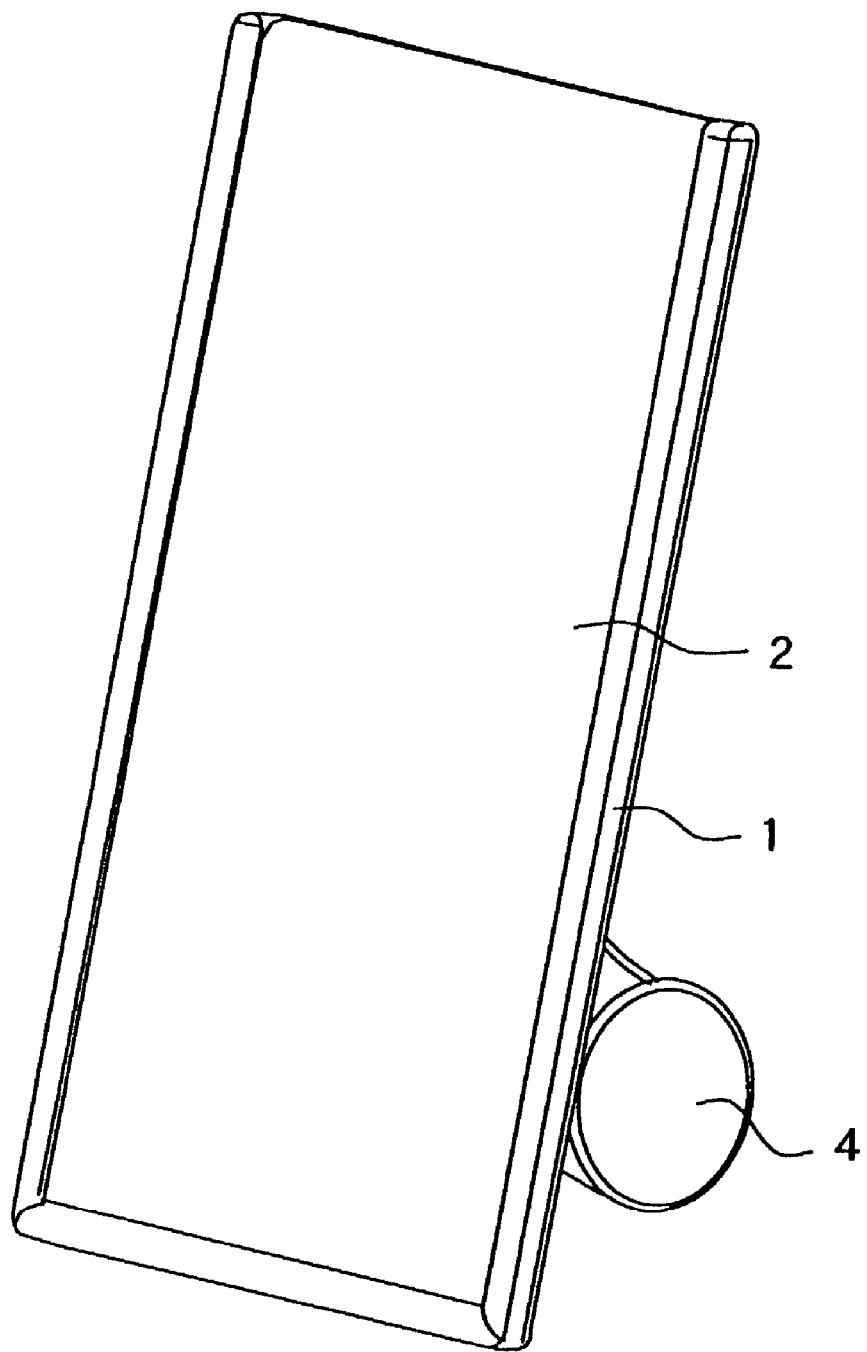
FIG. 13 is a perspective view showing the outer appearance of a display apparatus according to the second embodiment of the present invention.
Figure 14B:
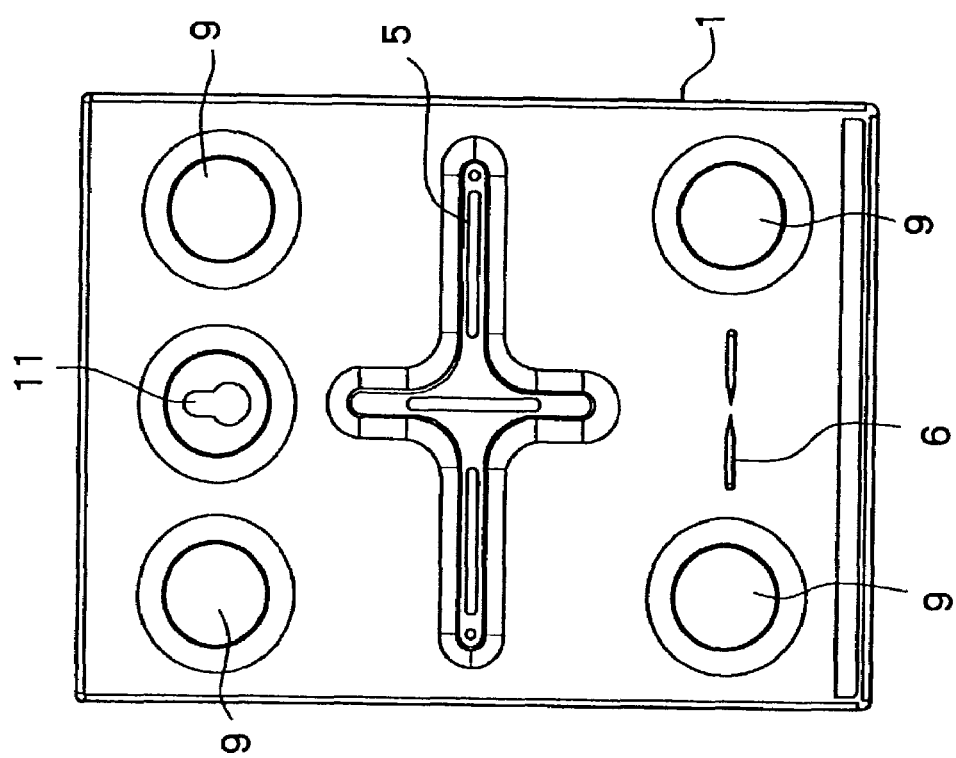
FIG. 14B is a rear view showing the display apparatus according to the second embodiment of the present invention.
Figure 14A:
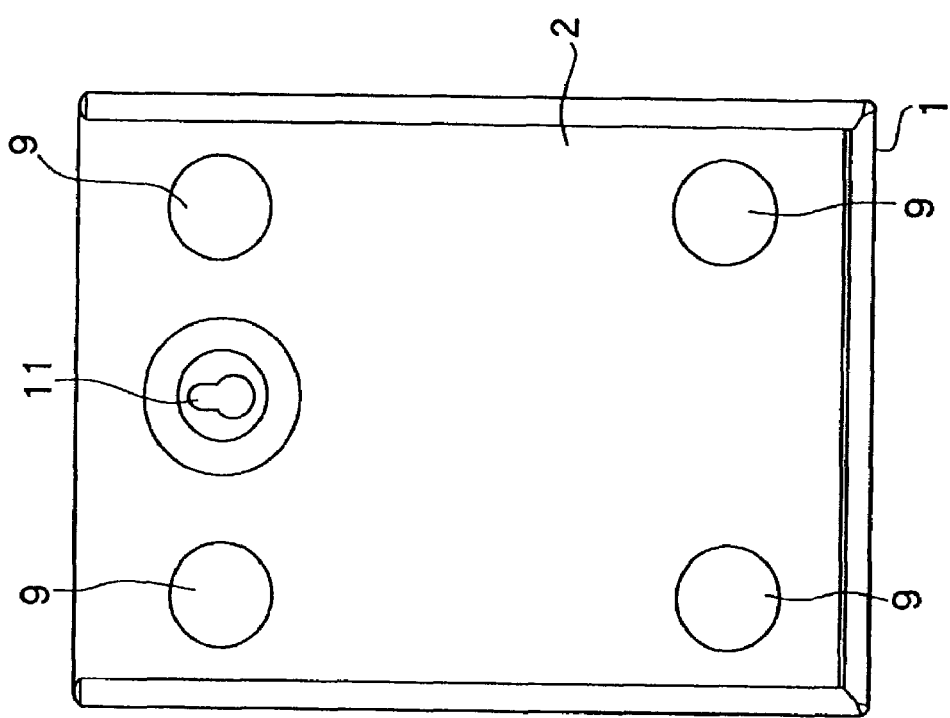
FIG. 14A is a front view showing the display apparatus according to the second embodiment of the present invention.

As shown in FIG. 13 and FIGS. 14A and 14B, in the display apparatus of the second embodiment, the frame 1 and lenticular lens 2 are detachably independently formed.

In this embodiment, in order to allow the user to easily discriminate the obverse/reverse surface of the lenticular lens 2, which is readily mistaken upon inserting the object to be displayed, at least one side (corner) of the lenticular lens 2 may be notched, as shown in FIG. 15A. When the upper left corner with respect to the obverse surface of the lens is notched in this way, the lens can be set to have its convex surface facing up by inserting the lens to have its upper left corner to direct upward, and a stereoscopic image/moving image can be surely inserted and displayed.

With this method, the reverse surface of a convex surface 2a of the lenticular lens 2 can contact an image surface 8a of an object 8 to be displayed to allow the user to observe a stereoscopic image, as shown in FIG. 15B, and a state wherein the convex surface 2a of the lenticular lens 2 contacts the image surface 8a of the object 8 to be displayed shown in FIG. 15C so as to merely display blurred images on stripes can be prevented.

Especially, in case of a high-resolution lenticular lens 2 having a very small pitch, it is hard to discriminate its obverse/reverse surface, and an effect of reducing insertion errors can be demonstrated in tests by describing an instruction for insertion in a user's guide.

In this embodiment, since a support member which is detachable from the frame is added, as shown in FIG. 13 and FIGS. 14A and 14B, the display apparatus can stand upright by itself.

With this embodiment, the display apparatus can be placed in two different positions, i.e., portrait and landscape positions. In the portrait position, the lenticular lens 2 extends in the vertical direction, and a stereoscopic image can be formed, as has been explained in the principle of the prior art. Also, in the landscape position, the lenticular lens 2 extends in the horizontal position, and a moving image can be formed.

The principle of allowing the user to observe a stereoscopic image/moving image via such lenses is the same as that in the prior art, and a description thereof will be omitted.

[Third Embodiment]

A display apparatus according to the third embodiment of the present invention will be described below.

Figure 16:
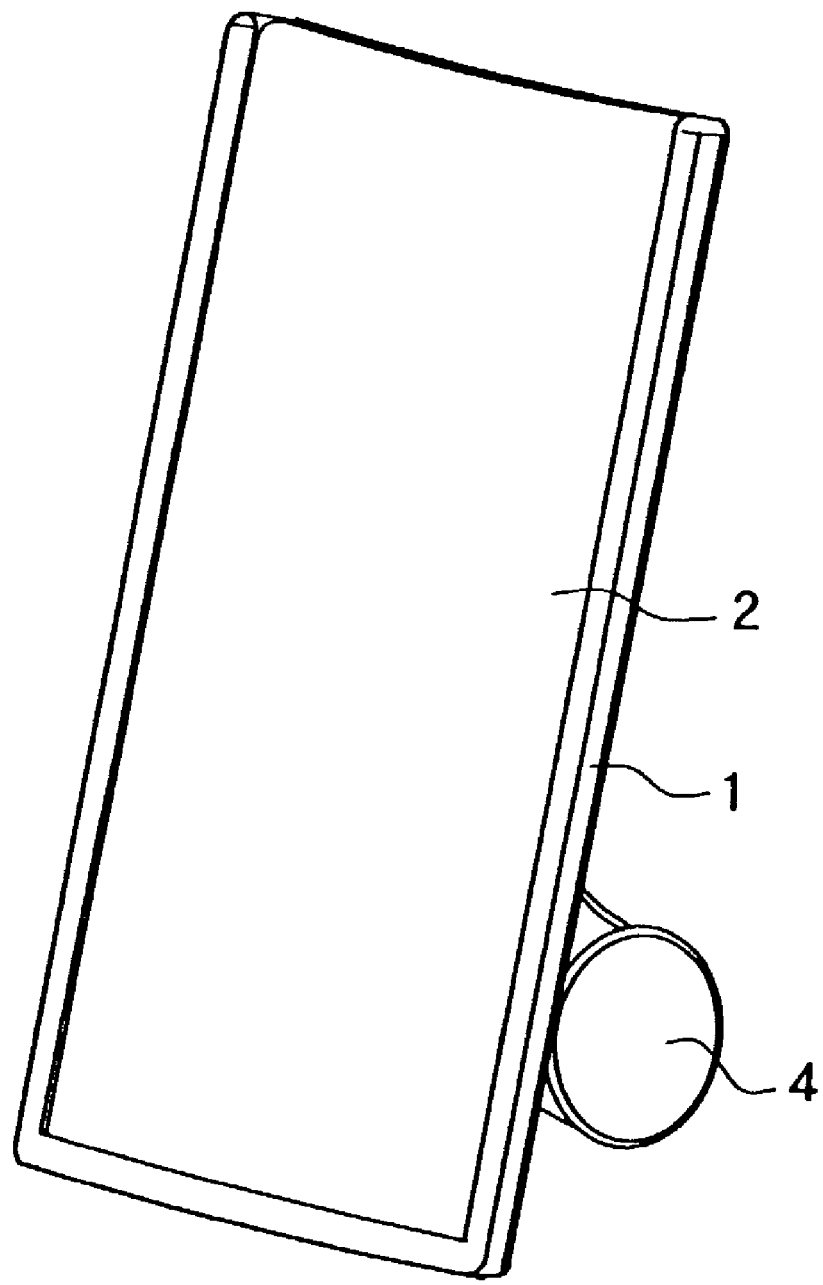
FIG. 16 is a perspective view showing the outer appearance of a display apparatus according to the third embodiment of the present invention.
Figure 17:
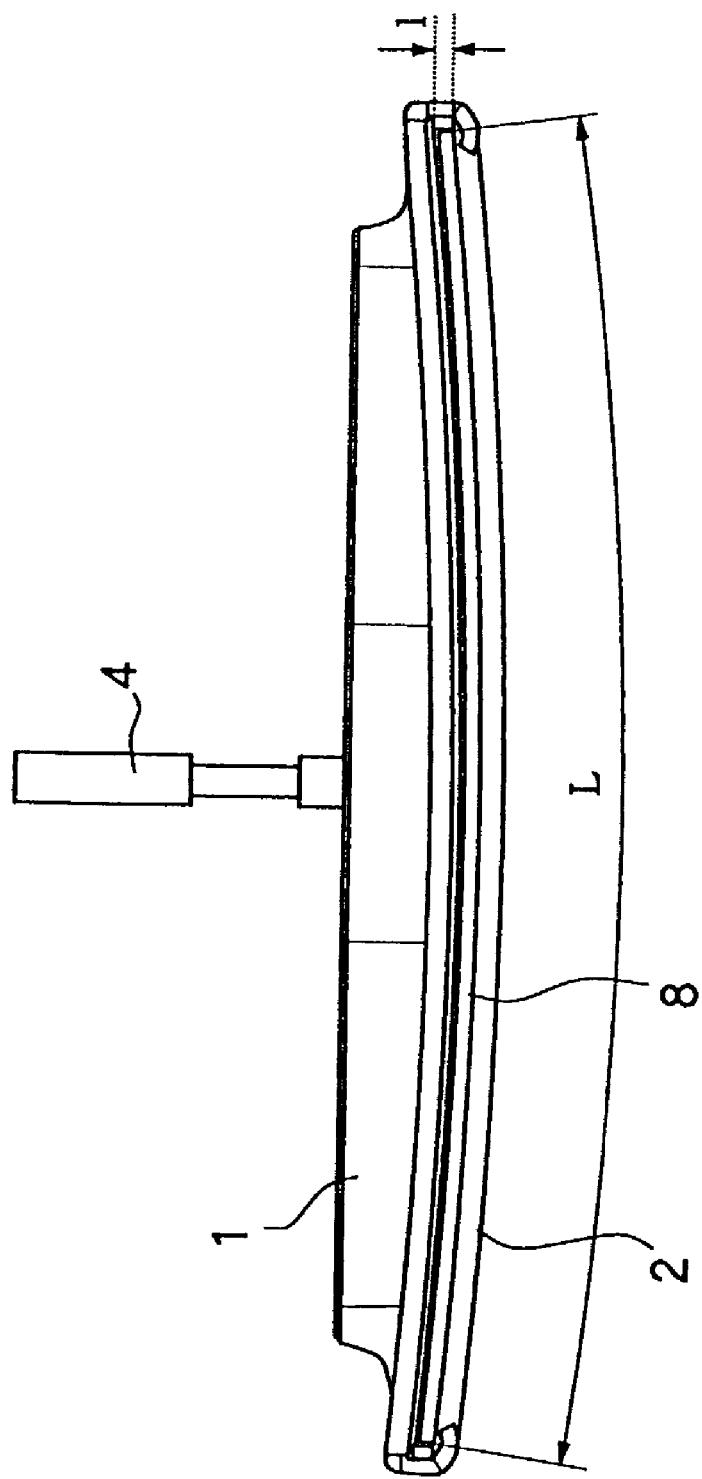
FIG. 17 is a top view of FIG. 16.

FIGS. 16 and 17 show a display apparatus with a detachable lenticular lens, which is compatible to a high-resolution stereoscopic image (moving image). In the third embodiment, the frame 1, lenticular lens 2, and pressing plate have a positive curvature with respect to the display direction.

According to the lenticular lens scheme, in general, the thickness of the lenticular lens 2 is increased to obtain a high stereoscopic effect, and the lens pitch is increased to obtain a high feeling of depth. Hence, a sense of depth can be obtained, but the resolution of hair, a fine pattern, or the like suffers. Therefore, in order to attain both high stereoscopic effect and acceptable resolution, the lens pitch must be decreased while the lens thickness must be increased. However, when the lens pitch is decreased, the number of stripe images that can be formed within the lens pitch is limited in a low-resolution printing apparatus (e.g., less than 400 dpi), and the stereoscopic effect impairs since the number of stripe images required to obtain a high stereoscopic effect becomes small. Conversely, in a high-resolution printing apparatus (400 dpi or higher), the number of stripe images that can be formed within the lens pitch can be increased, and the stereoscopic effect can be enhanced since the number of stripe images required to obtain a high stereoscopic effect becomes large. In this case, however, the stripe images must be accurately aligned to fall within the pitch of the lenticular lens 2, and must be in tight contact with the lens.

To solve such problems, since the entire frame 1 is given a positive curvature in the third embodiment, when the object to be displayed on which a stereoscopic image (moving image) is printed is clamped between the lenticular lens 2 and pressing plate, the object to be displayed can have a slight curvature, and can uniformly contact the reverse surface of the lenticular lens 2 by its stiffness. Therefore, even when a high-resolution (400 dpi or more and, preferably, 600 dpi or higher) stereoscopic image (moving image) is processed to obtain a higher stereoscopic effect, the stereoscopic effect can be maximized due to high contact.

As shown in FIG. 17, the lenticular lens 2 and frame 1 have a width L, and a curvature in which the central portion projects toward the front surface side by 1.

In this embodiment, L=105 mm and l=1.5 mm. In this case, the radius R of curvature is about 500 mm.

Such curvature cannot be categorically specified, but it is desirable to set the projection amount 1 to fall within the range from 0.5% to 20% with respect to the width L. The curvature need not always have uniform R, but may use a function such as a quadratic function, cubic function, trigonometric function, or the like.

As in the second embodiment, this arrangement allows the user to place the display apparatus in two different positions, i.e., portrait and landscape positions. In the portrait position, the lenticular lens 2 extends in the vertical direction, and a stereoscopic image can be formed, as has been explained in the principle of the prior art. Also, in the landscape position, the lenticular lens 2 extends in the horizontal state, and a moving image can be formed.

Also, test results demonstrate that the stereoscopic effect can be enhanced by giving a slight curvature.

In this embodiment, all of the lens, frame, and pressing plate have a slight curvature. However, a slight curvature may be given to only the frame, as long as the lens and the pressing plate as needed are deformable.

[Another Embodiment]

In each of the above embodiments, holes are symmetrically formed at the four corners of the back surface. However, holes may be formed at two diagonal positions or only upper or lower two positions; it suffices to form a plurality of adjustment holes.

For example, if only one hole is formed, it is not easy to counterbalance oblique alignment. Hence, when alignment is made by reciprocally moving the image, the image can be very easily adjusted at least at two positions by the right and left fingers even in increments of several ten microns, while confirming the image.

In each of the above embodiments, the convex shaped lenticular lens is illustrated and explained as an example. The lenticular lens also can be formed into a concave shape. According to the concave shaped lenticular lens structure, tight contact between the lens and object to be displayed can be achieved, and also the same effects as the convex shaped lenticular lens can be achieved.

The present invention is not limited to the above embodiments and various changes and modifications can be made within the spirit and scope of the present invention. Therefore, to appraise the public of the scope of the present invention, the following claims are made.

What is claimed is:

1. A display apparatus which has a lenticular lens on a display surface of a display unit that houses an object to be displayed, and has an arm on a back surface thereof to allow the display unit stand upright,
wherein the arm is symmetrically formed to allow the display unit to stand upright on any of upper, lower, right, and left sides thereof, and an attachment pattern of the arm with respect to the back surface of the display unit can be changed.

2. The apparatus according to claim 1, wherein the object to be displayed is inserted to be in tight contact with a rear surface of the lenticular lens which is formed integrally with the display unit, and after the object to be displayed is inserted, a position of an image formed on the object to be displayed can be adjusted by two-dimensionally moving the object to be displayed by at least two adjusters formed on the back surface of the display unit.

3. The apparatus according to claim 1, wherein the object to be displayed is inserted to be in tight contact with a rear surface of the lenticular lens which is formed to be independent of and detachable from the display unit, and after the object to be displayed is inserted, a position of an image formed on the object to be displayed can be adjusted by independently and two-dimensionally moving the object to be displayed and the lenticular lens by at least two adjusters formed on the back surface of the display unit.

4. The apparatus according to claim 1, wherein a stereoscopic image obtained by forming a plurality of parallax images in a stripe pattern from a two-dimensional image, a moving image obtained by forming a plurality of time difference images in a stripe pattern, or a stereoscopic image obtained by forming a plurality of parallax images in a stripe pattern from a three-dimensional image is formed on the object to be displayed.

5. The apparatus according to claim 4, wherein the stereoscopic image or moving image is formed by an ink-jet print method.

6. The apparatus according to claim 5, wherein the stereoscopic image or moving image is printed at a resolution of not less than 400 dpi or 600 dpi.

7. The apparatus according to claim 1, wherein at least a portion of an outer edge portion of the lenticular lens has a shape different from other portions.

8. The apparatus according to claim 7, wherein at least portion of the outer edge portion of the lenticular lens is notched.

9. The apparatus according to claim 1, wherein the lenticular lens is designed to allow a user to observe the object to be displayed as a stereoscopic image when the lenticular lens is placed in a portrait position, and as a moving image when the lenticular lens is placed in a landscape position.

10. The apparatus according to claim 2, wherein the object to be displayed is brought into tight contact with the rear surface of the lenticular lens when the object to be displayed is clamped by a pressing plate formed with the adjusters.

11. The apparatus according to claim 3, wherein the object to be displayed is brought into tight contact with the rear surface of the lenticular lens when the object to be displayed is clamped by a pressing plate having the adjusters.

12. The apparatus according to claim 10, wherein the lenticular lens is formed into a convex shape, and the object to be displayed and the pressing plate having the adjusters are formed into a convex shape in correspondence with the lenticular lens.

13. The apparatus according to claim 11, wherein the lenticular lens is formed into a convex shape, and the object to be displayed and the pressing plate having the adjusters are formed into a convex shape in correspondence with the lenticular lens.

14. The apparatus according to claim 11, wherein the lenticular lens is formed into a concave shape, and the object to be displayed and the pressing plate having the adjusters are formed into a concave shape in correspondence with the lenticular lens.

15. The apparatus according to claim 1, wherein at least the lenticular lens is formed of a styrene-based material.

* * * * *

UNITED STATES PATENT AND TRADEMARK OFFICE
CERTIFICATE OF CORRECTION

PATENT NO. : 6,992,693 B2
APPLICATION NO. : 10/230112
DATED : January 31, 2006
INVENTOR(S) : Hiroshi Tajika et al.

It is certified that error appears in the above-identified patent and that said Letters Patent is hereby corrected as shown below:

[56] REFERENCES CITED:

OTHER PUBLICATIONS, "S.H. Kaplam," should read --S.H. Kaplan,--.

COLUMN 3:

Line 26, "stand" should read --to stand--.

COLUMN 8:

Line 24, "(N>2)]" should read --(N$\geq$2)]--.

COLUMN 13:

Line 55, "sufficies" should read --suffices--.

COLUMN 14:

Line 15, "stand" should read --to stand--.
Line 51, "least" should read --least a--.

Signed and Sealed this

Tenth Day of October, 2006

JON W. DUDAS
*Director of the United States Patent and Trademark Office*